(12) United States Patent
Dextreit et al.

(10) Patent No.: US 9,815,451 B2
(45) Date of Patent: Nov. 14, 2017

(54) HYBRID ELECTRIC VEHICLE CONTROL SYSTEM AND METHOD

(71) Applicant: Jaguar Land Rover Limited, Coventry (GB)

(72) Inventors: Clement Dextreit, Coventry (GB); Mark Ellis, Coventry (GB); Matt Hancock, Coventry (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 63 days.

(21) Appl. No.: 14/650,716

(22) PCT Filed: Dec. 10, 2013

(86) PCT No.: PCT/EP2013/076121
§ 371 (c)(1),
(2) Date: Jun. 9, 2015

(87) PCT Pub. No.: WO2014/090820
PCT Pub. Date: Jun. 19, 2014

(65) Prior Publication Data
US 2015/0314775 A1 Nov. 5, 2015

(30) Foreign Application Priority Data

Dec. 10, 2012 (GB) .................................. 1222182.6

(51) Int. Cl.
*B60L 9/00* (2006.01)
*G05D 1/00* (2006.01)
(Continued)

(52) U.S. Cl.
CPC ......... *B60W 20/1088* (2013.01); *B60K 6/442* (2013.01); *B60W 10/06* (2013.01);
(Continued)

(58) Field of Classification Search
CPC combination set(s) only.
See application file for complete search history.

(56) References Cited

U.S. PATENT DOCUMENTS 5,927,415 A * 7/1999 Ibaraki .................... B60K 6/48
180/65.25
6,176,807 B1 * 1/2001 Oba ....................... B60K 6/365
180/65.25

(Continued)

FOREIGN PATENT DOCUMENTS

DE 100 35 027 A1 1/2002
EP 0 769 402 A 4/1997
(Continued)

*Primary Examiner* — Bhavesh V Amin
(74) *Attorney, Agent, or Firm* — Myers Bigel, P.A.

(57) ABSTRACT

The invention relates to a control system for a hybrid electric vehicle (100), the vehicle having a powertrain (135) comprising at least one electric propulsion motor (123) and at least one engine (121), the control system being operable to control the vehicle to operate in an electric vehicle (EV) mode in which the at least one engine remains switched off and the at least one electric propulsion motor is configured to deliver drive torque and a boost mode in which the at least one engine is switched on to provide additional power to drive the vehicle. When the vehicle is operating in EV mode the system is further operable to determine whether a boost location exists ahead of the vehicle being a location at which a gradient of a driving surface is sufficiently high to require selection of the boost mode, the control system being operable automatically to command starting of the at least one engine before the boost location is reached.

22 Claims, 4 Drawing Sheets

(51) Int. Cl.

| | |
|---|---|
| *B60W 20/00* | (2016.01) |
| *B60K 6/442* | (2007.10) |
| *B60W 50/08* | (2012.01) |
| *B60W 10/06* | (2006.01) |
| *B60W 10/08* | (2006.01) |
| *B60W 50/00* | (2006.01) |
| *B60W 30/14* | (2006.01) |
| *B60W 20/40* | (2016.01) |
| *B60W 20/11* | (2016.01) |
| *B60W 20/12* | (2016.01) |
| *B60W 20/19* | (2016.01) |

(52) U.S. Cl.
CPC .......... *B60W 10/08* (2013.01); *B60W 20/00* (2013.01); *B60W 20/11* (2016.01); *B60W 20/12* (2016.01); *B60W 20/19* (2016.01); *B60W 20/40* (2013.01); *B60W 30/143* (2013.01); *B60W 50/0097* (2013.01); *B60W 50/085* (2013.01); *B60W 2550/142* (2013.01); *B60W 2550/143* (2013.01); *B60W 2550/145* (2013.01); *B60W 2550/22* (2013.01); *B60W 2550/402* (2013.01); *B60W 2710/0677* (2013.01); *B60W 2710/086* (2013.01); *B60W 2720/10* (2013.01); *Y02T 10/48* (2013.01); *Y02T 10/84* (2013.01); *Y10S 903/93* (2013.01)

(56) References Cited

U.S. PATENT DOCUMENTS

| | | | | |
|---|---|---|---|---|
| 6,321,143 B1 * | 11/2001 | Phillips | ............. | B60K 6/485 180/165 |
| 6,328,672 B1 * | 12/2001 | Eguchi | ............. | B60K 6/485 477/114 |
| 6,381,522 B1 | 4/2002 | Watanabe et al. | | |
| 6,487,477 B1 * | 11/2002 | Woestman | ............. | B60K 6/365 180/65.235 |
| 6,823,840 B1 * | 11/2004 | Tamai | ............. | B60K 6/485 123/352 |
| 6,832,148 B1 * | 12/2004 | Bennett | ............. | B60K 6/445 180/65.225 |
| 7,325,638 B1 | 2/2008 | Belloso | | |
| 8,335,605 B2 * | 12/2012 | Mueller | ............. | B60W 10/26 701/22 |
| 8,430,777 B2 * | 4/2013 | Yamada | ............. | B60K 6/365 475/284 |
| 8,433,494 B2 * | 4/2013 | Vogel | ............. | B60W 10/06 701/1 |
| 8,740,744 B2 * | 6/2014 | Grutter | ............. | B60K 6/48 477/5 |
| 8,996,218 B2 * | 3/2015 | Gehring | ............. | B60W 10/06 180/65.265 |
| 2001/0008192 A1 * | 7/2001 | Morisawa | ............. | B60K 6/46 180/197 |
| 2001/0042648 A1 * | 11/2001 | Wakashiro | ............. | B60K 6/485 180/65.26 |
| 2002/0188387 A1 * | 12/2002 | Woestman | ............. | B60K 6/00 701/22 |
| 2003/0028311 A1 * | 2/2003 | Seto | ............. | B60K 31/0008 701/96 |
| 2003/0098187 A1 * | 5/2003 | Phillips | ............. | B60K 6/48 180/65.25 |
| 2003/0160455 A1 * | 8/2003 | Hu | ............. | B60K 6/48 290/40 C |
| 2004/0134698 A1 * | 7/2004 | Yamamoto | ............. | B60K 6/44 180/65.225 |
| 2005/0211479 A1 | 9/2005 | Tamor | | |
| 2006/0175103 A1 | 8/2006 | Iida et al. | | |
| 2007/0114084 A1 | 5/2007 | Huelser et al. | | |
| 2007/0275819 A1 * | 11/2007 | Hirata | ............. | B60K 6/365 477/5 |
| 2009/0224713 A1 * | 9/2009 | Falkenstein | ............. | B60K 6/48 318/432 |
| 2010/0235064 A1 * | 9/2010 | Mallet | ............. | B60T 7/122 701/70 |
| 2011/0112708 A1 | 5/2011 | Fassnacht | | |
| 2011/0130908 A1 * | 6/2011 | Mueller | ............. | B60W 10/26 701/22 |
| 2011/0130939 A1 * | 6/2011 | Hartmann | ............. | B60W 10/02 701/93 |
| 2011/0172862 A1 * | 7/2011 | Ortmann | ............. | B60K 6/48 701/22 |
| 2011/0174559 A1 * | 7/2011 | Saito | ............. | B60K 6/48 180/65.27 |
| 2012/0115659 A1 * | 5/2012 | Yamada | ............. | B60K 6/365 475/5 |
| 2013/0066493 A1 * | 3/2013 | Martin | ............. | B60W 20/00 701/22 |
| 2013/0297161 A1 * | 11/2013 | Gibson | ............. | B60W 20/00 701/54 |
| 2014/0031170 A1 * | 1/2014 | Cunningham | ............. | F02D 23/00 477/53 |
| 2015/0314775 A1 * | 11/2015 | Dextreit | ............. | B60W 20/19 701/22 |

FOREIGN PATENT DOCUMENTS

| | | |
|---|---|---|
| JP | H11266507 A | 9/1999 |
| JP | 2012-116411 A | 6/2012 |
| WO | WO 2011/128410 A1 | 10/2011 |

* cited by examiner ently incorporated herein by reference in their entireties. The above-referenced PCT International Application was published in the English language as International Publication No. WO 2014/090820 A1 on Jun. 19, 2014.

HYBRID ELECTRIC VEHICLE CONTROL SYSTEM AND METHOD

RELATED APPLICATIONS

This application is a 35 U.S.C. §371 national stage application of PCT Application No. PCT/EP2013/076121, filed on Dec. 10, 2013, which claims priority from Great Britain Patent Application No. 1222182.6, filed on Dec. 10, 2012, the contents of which are incorporated herein by reference in their entireties. The above-referenced PCT International Application was published in the English language as International Publication No. WO 2014/090820 A1 on Jun. 19, 2014.

FIELD OF THE INVENTION

The present invention relates to a vehicle and method of control thereof. In particular, but not exclusively, the invention relates to a hybrid electric vehicle and a method of controlling a hybrid electric vehicle.

BACKGROUND

It is known to provide a hybrid electric vehicle having a powertrain that includes an engine and an electric propulsion motor. In so-called parallel hybrid vehicles the engine and electric propulsion motor are each operable to deliver tractive or motive torque to drive the vehicle.

In some parallel hybrid vehicles the powertrain is operable in a parallel mode in which the engine and propulsion motor deliver drive torque or an electric vehicle (EV) mode in which the electric propulsion motor alone delivers drive torque and the engine remains off.

In some known hybrid vehicles, if the vehicle is driving in EV mode and the propulsion motor is unable to deliver the amount of torque demanded by the driver, the vehicle may switch on the engine automatically in order to meet the driver demand for torque.

The present applicant has recognised that an amount of noise, vibration and harshness (NVH) associated with a transition of the powertrain from EV mode to parallel mode when driver demand is sufficiently high can be undesirable. Drivability of a vehicle can be adversely affected due to the time required for the transition to be made (i.e. the powertrain response time). Furthermore excessive component wear such as engine and/or clutch wear may be incurred by relatively sudden demands for torque from a stopped engine. Embodiments of the invention seek to mitigate one or more of the above mentioned problems.

STATEMENT OF THE INVENTION

Aspects of the present invention provide a system, a vehicle and a method as claimed in the appended claims.

In one aspect of the invention for which protection is sought there is provided a control system for a hybrid electric vehicle, the vehicle having a powertrain comprising at least one electric propulsion motor and at least one engine, the control system being operable to control the vehicle to operate in an electric vehicle (EV) mode in which the at least one engine remains switched off and the at least one electric propulsion motor is configured to deliver drive torque and a boost mode in which the at least one engine is switched on to provide additional power to drive the vehicle, wherein when the vehicle is operating in EV mode the system is further operable to determine whether a boost location exists ahead of the vehicle being a location at which a gradient of a driving surface is sufficiently high to require selection of the boost mode, the control system being operable automatically to command starting of the at least one engine before the boost location is reached.

It is to be understood that in EV mode the engine is switched off and the at least one electric machine is configured to deliver drive torque even if the at least one electric machine does not deliver drive torque continually. That is, in EV mode the at least one electric machine delivers required drive torque, but if no drive torque is required at a given moment in time the at least one electric machine may cease delivery of drive torque, the vehicle being considered to remain in EV mode even whilst the at least one electric machine is not delivering drive torque provided the engine remains switched off.

In embodiments of the control system, in the boost mode the additional power to drive the vehicle is preferably that power additional to the power providable by the at least one electric propulsion motor which is required to drive the vehicle at a desired vehicle speed. The boost location may be a location at which a gradient of a driving surface is sufficiently high to require selection of the boost mode in order to maintain the desired vehicle speed.

By "additional power" is preferably meant that motive power, in addition to the or any drive-torque-delivering power able to be provided by the at least one electric propulsion motor, which is required in order to drive the vehicle at the desired vehicle speed. Such additional power provided by the at least one engine in order to drive the vehicle in the boost mode is thus preferably additional to any drive torque provided by the at least one electric propulsion motor, which may or not be required to provide drive torque when the vehicle is operated in the boost mode. Thus, in the boost mode the at least one electric propulsion motor may be set to a non-drive torque producing condition such as an idling condition. In some embodiments the at least one electric propulsion motor may be operable as a generator and be caused to operate as a generator when the vehicle is in the boost mode. The at least one electric propulsion motor may be configured to operate as a generator at least in part in dependence on the amount of drive torque required at a given moment in time and, optionally, a state of charge of an energy storage device such as a battery.

It is to be understood that if the engine is capable of delivering the required amount of drive torque to a driveline of a vehicle at a given moment in time whilst the boost mode is selected and the engine is also capable of driving a generator to recharge a battery of the vehicle, the vehicle control system may cause the engine to drive the generator to generate charge.

The desired vehicle speed may for example be a current driving speed of the vehicle, or some other speed desired by the driver, such as a maximum permitted speed (e.g. a legal speed limit) or an optimum speed dictated by the driving or road conditions, or some other driving parameter. Alternatively the desired speed may be a target speed of a speed control system such as a cruise control system of the vehicle.

Thus in some embodiments of the control system the system is operable to allow a driver to set a target vehicle speed and to control the powertrain to maintain the target vehicle speed, and wherein the boost location is a location at which a gradient of a driving surface is sufficiently high to require selection of the boost mode in order to maintain the target vehicle speed.

Thus in some embodiments of the above-defined system aspect of the invention there is provided a control system for a hybrid electric vehicle, the vehicle having a powertrain comprising at least one electric propulsion motor and at least one engine, the control system being operable to control the vehicle to operate in an electric vehicle (EV) mode in which the at least one engine remains switched off and the at least one electric propulsion motor is configured to deliver drive torque and a boost mode in which the at least one engine is switched on to provide additional power to drive the vehicle, the system being operable to allow a driver to set a target vehicle speed and to control the powertrain to maintain the target vehicle speed, wherein when the vehicle is operating in EV mode the system is further operable to determine whether a boost location exists ahead of the vehicle being a location at which a gradient of a driving surface is sufficiently high to require assumption of the boost mode in order to maintain the target vehicle speed, the control system being operable automatically to command starting of the at least one engine before the boost location is reached.

Some embodiments of the invention have the advantage that a hybrid vehicle may be operated in a manner wherein noise, vibration and/or harshness associated with a transition from an EV mode to a boost mode, such as a parallel mode in the case of a parallel hybrid electric vehicle, when additional power is required to drive the vehicle may be reduced. In some embodiments drivability may be improved. In the case of a parallel hybrid electric vehicle, the boost mode may be a parallel mode in which an engine delivers drive torque to a driveline of a vehicle in addition to or instead of at least one electric machine.

The at least one engine may comprise an internal combustion engine.

Advantageously the control system may be operable to command starting of the at least one engine sufficiently in advance of arrival at the boost location that the at least one engine may provide additional power substantially at that location.

The system may be operable to determine when to start the at least one engine in dependence on an amount of time required to start the at least one engine and an amount of time required to deliver power to drive the vehicle by means of the at least one engine following starting of the at least one engine. The amount of time required to start the at least one engine and/or to deliver power to drive the vehicle may be determined taking into account one or more vehicle or engine operating parameters.

The system may be operable to control the vehicle to operate in a parallel HEV mode in which the at least one engine delivers drive torque to drive the vehicle.

In the case of a parallel hybrid vehicle the time to deliver power may correspond to the time required to match the speed of the at least one engine to that of a driveline of the vehicle and connect the at least one engine to the driveline, for example by closing a clutch in some embodiments, thereby to deliver additional drive torque directly from the engine. he boost mode may therefore be referred to as an engine-on mode or parallel mode. As noted above, in some embodiments, in the boost mode the system may be configured to cause the engine to deliver drive torque in addition to at least one electric machine (which may be referred to as a parallel boost mode, not to be confused with a boost mode) as noted above, or to cause the engine to generate drive torque and the at least one electric machine to be operated in an idle condition (which may be referred to as a parallel idle mode), substantially stationary condition, or operated as a generator driven by the engine (which may be referred to as a parallel recharge mode). Whether the at least one electric machine delivers positive drive torque may be determined by the system at least in part by reference to the magnitude of the driver demanded torque, the amount of torque the engine is capable of producing, a state of charge of an energy storage device such as a battery, and/or one or more other parameters in addition or instead. In some embodiments, in the boost mode the engine and at least one electric machine are both configured to deliver positive drive torque regardless of the amount of driver demanded torque, i.e. in the boost mode the vehicle assumes the parallel boost mode.

In addition or instead the system may be operable to control the vehicle to operate in a series HEV mode in which the at least one engine drives a generator to generate electricity to power the at least one electric propulsion motor.

It is to be understood that in some series hybrid vehicles the powertrain may be unable to deliver sufficient electric current to the at least one electric propulsion motor to maintain a required speed without starting the at least one engine. This may for example be due to a limitation on an amount of current that a battery of the vehicle may deliver at a given moment in time. Accordingly the vehicle may be operable to allow additional charge to be generated by means of one or more generators powered by the at least one engine in order to generate additional current for the at least one electric propulsion motor and allow the vehicle to maintain a target speed after reaching the boost location.

Advantageously when the vehicle is operating in the boost mode the control system may be operable to identify an EV mode location being a location ahead of the vehicle at which a gradient of the driving surface will be sufficiently low to allow resumption of operation in EV mode whilst allowing the target speed to be maintained.

Further advantageously, the system may be further arranged to determine a location of the next boost location ahead of the next EV mode location.

The system may be operable to over-ride assumption of the EV mode at the next EV mode location if a time to travel from the next EV mode location to the following boost location is less than a prescribed time or a distance between the locations is less than a prescribed value.

Optionally, when the vehicle is operating in boost mode the system may be operable to assume EV mode in advance of arrival at an EV mode location if the system determines that EV mode may be assumed without a drop in vehicle speed exceeding a prescribed value before the EV mode location is reached.

Thus the control system may pre-empt stopping of the at least one engine when the EV mode location is reached by stopping the at least one engine before the EV mode location is reached. The control system may first ensure that a drop in speed of the vehicle will not exceed a prescribed value before permitting early assumption of EV mode. The vehicle may be configured to estimate a drop in speed of the vehicle in dependence on data in respect of a gradient of the driving surface ahead of the vehicle, an estimate of a weight of the vehicle and optionally one or more further parameters such as a determination as to whether the vehicle is towing a load, an amount of drag associated with vehicle motion and one or more further parameters in addition or instead.

Advantageously the system may be operable to determine whether EV mode may be assumed in advance of arrival at the EV mode location without a drop in vehicle speed exceeding a prescribed value in further dependence on at least one selected from amongst a current speed of the vehicle and a current rate of acceleration of the vehicle.

In some embodiments, early assumption of EV mode is permitted only if a current speed of the vehicle exceeds a prescribed value. In addition or instead, in some embodiments early assumption of EV mode is permitted only if a current rate of acceleration is not negative (i.e. if the vehicle is not decelerating). In some embodiments a current rate of acceleration of the vehicle must be positive.

The control system may be operable in a first mode in which a target speed set by the driver is maintained with the at least one engine maintained switched off and a second mode in which a target speed set by the driver is maintained without inhibiting stopping and starting of the at least one engine.

The control system may be operable to start the at least one engine in advance of arrival at the boost location only if the control system is operated in the first mode.

Advantageously the system may comprise location determining means, the system being operable to receive data in respect of vehicle location and to determine driving surface gradient in dependence on the vehicle location data.

The location determining means may comprise one or more selected from amongst a global positioning system (GPS) receiver and a cellular network location determination system.

The system may be operable to access a database containing data corresponding to a height or altitude of a driving surface as a function of location and to calculate a gradient of a driving surface ahead of the vehicle in dependence on said data and the data in respect of the location of the vehicle.

The system may be operable to access a database containing data in respect of driving surface gradient as a function of location and to determine a gradient of a driving surface ahead of the vehicle in dependence on the data in respect of the location of the vehicle.

In some embodiments of the control system of the above aspect of the invention the system may be operable automatically to command starting of the at least one engine before the boost location is reached regardless of whether or not a target vehicle speed has been set by the driver and the powertrain is controlled to maintain the target vehicle speed. Thus some embodiments of the control system may be applicable to a hybrid electric vehicle regardless of whether or not a cruise control system it includes is actually operative or in use, or even regardless of whether or not the vehicle includes a cruise control system at all.

In a further aspect of the invention for which protection is sought there is provided a hybrid electric vehicle comprising a system according to a preceding aspect or any embodiment thereof.

In another aspect of the invention for which protection is sought there is provided a method of controlling a hybrid electric vehicle by means of a control system, the vehicle having a powertrain comprising at least one electric propulsion motor and at least one engine, the method comprising controlling the powertrain to operate in an electric vehicle (EV) mode in which the at least one engine remains switched off and the at least one electric propulsion motor is configured to deliver drive torque or a boost mode in which the at least one engine is switched on to provide additional power to drive the vehicle, wherein when in EV mode the method comprises determining by means of the control system whether a boost location exists ahead of the vehicle being a location at which a gradient of a driving surface is sufficiently high to require assumption of the boost mode, and wherein if a boost location is identified ahead of the vehicle the method comprises commanding automatically by means of the control system starting of the at least one engine before the boost location is reached.

In embodiments of the method, in the boost mode the additional power to drive the vehicle is preferably that power additional to the power provided by the at least one electric propulsion motor which is required to drive the vehicle at a desired vehicle speed, and wherein the boost location is a location at which a gradient of a driving surface is sufficiently high to require selection of the boost mode in order to maintain the desired vehicle speed.

As in other aspects of the invention, by "additional power" is preferably meant that motive power, in addition to the or any drive-torque-delivering power able to be provided by the at least one electric propulsion motor, which is required in order to drive the vehicle at the desired vehicle speed. Such additional power provided by the at least one engine in order to drive the vehicle in the boost mode is thus preferably additional to any non-drive-torque-delivering power provided by the at least one electric propulsion motor, which may for example be substantially stationary, idling or being used as a generator.

The desired vehicle speed may for example be a current driving speed of the vehicle, or some other speed desired by the driver, such as a maximum permitted speed (e.g. a legal speed limit) or an optimum speed dictated by the driving or road conditions, or some other driving parameter. Alternatively the desired speed may be a target speed of a cruise control system of the vehicle.

Thus in some embodiments of the method the method comprises allowing a driver to set a target vehicle speed and controlling the powertrain by means of the control system to maintain the target vehicle speed, and wherein the boost location may be a location at which a gradient of a driving surface is sufficiently high to require assumption of the boost mode in order to maintain the target vehicle speed.

Thus in some embodiments of the above-defined method aspect of the invention there is provided a method of controlling a hybrid electric vehicle by means of a control system, the vehicle having a powertrain comprising at least one electric propulsion motor and at least one engine, the method comprising controlling the powertrain to operate in an electric vehicle (EV) mode in which the at least one engine remains switched off and the at least one electric propulsion motor delivers drive torque or a boost mode in which the at least one engine is switched on to provide additional power to drive the vehicle, the method comprising allowing a driver to set a target vehicle speed and controlling the powertrain by means of the control system to maintain the target vehicle speed, wherein when in EV mode the method comprises determining by means of the control system whether a boost location exists ahead of the vehicle being a location at which a gradient of a driving surface is sufficiently high to require assumption of the boost mode in order to maintain the target vehicle speed, and whereby if a boost location is identified ahead of the vehicle the method comprises commanding automatically by means of the control system starting of the at least one engine before the boost location is reached.

The method may comprise controlling the powertrain to operate in a parallel recharge mode in which the engine drives a generator to recharge a battery of the vehicle, optionally the generator being provided by the electric propulsion motor operating in a generator mode.

In a further aspect of the invention for which protection is sought there is provided a hybrid electric vehicle comprising: control means; and a powertrain comprising at least one electric propulsion motor and at least one engine, the powertrain being operable by the control means in an electric vehicle (EV) mode in which the at least one engine remains switched off and the at least one electric propulsion motor delivers drive torque and a boost mode in which the at least one engine is switched on to provide additional power to drive the vehicle, the control means being operable to allow a driver to set a target vehicle speed and to control the powertrain to maintain the target vehicle speed, wherein when in boost mode the control means is further operable to determine whether an EV mode location exists ahead of the vehicle being a location at which a gradient of a driving surface is sufficiently low to allow assumption of the EV mode whilst maintaining the target vehicle speed to within a prescribed amount, the control means being operable to allow assumption of the EV mode before the EV mode location is reached responsive to a determination that a drop in vehicle speed before reaching the EV mode location will not exceed the prescribed amount.

Embodiments of the invention may have the advantage that the at least one engine may be stopped in advance of arrival at the EV mode location without substantially compromising vehicle performance. A reduction in fuel consumption and vehicle emissions may therefore be enjoyed.

In one aspect of the invention for which protection is sought there is provided a control system for a hybrid electric vehicle, the vehicle having a powertrain comprising at least one electric propulsion motor and at least one engine, the control system being operable to control the vehicle to operate in an electric vehicle (EV) mode in which the at least one engine remains switched off and the at least one electric propulsion motor delivers drive torque and an engine-on mode in which the at least one engine is switched on to provide power to drive the vehicle, wherein when the vehicle is operating in EV mode the system is further operable to determine whether an engine-on location exists ahead of the vehicle being a location at which a gradient of a driving surface is sufficiently high to require selection of the engine-on mode, the control system being operable automatically to command starting of the at least one engine before the engine-on location is reached.

In a further aspect of the invention for which protection is sought there is provided a hybrid electric vehicle comprising: control means; a powertrain comprising at least one electric propulsion motor; at least one engine, the powertrain being operable by the control means in an electric vehicle (EV) mode in which the at least one engine remains switched off and the at least one electric propulsion motor delivers drive torque and a boost mode in which the at least one engine is switched on to provide additional power to drive the vehicle, wherein when in boost mode the control means is further operable to determine whether an EV mode location exists ahead of the vehicle being a location at which a gradient of a driving surface is sufficiently low to allow assumption of the EV mode whilst maintaining the target vehicle speed to within a prescribed amount, the control means being operable to allow assumption of the EV mode before the EV mode location is reached responsive to a determination that a drop in vehicle speed before reaching the EV mode location will not exceed the prescribed amount.

Some embodiments of the present invention provide a hybrid electric vehicle being a host vehicle comprising: control means such as a controller; and a powertrain comprising at least one electric propulsion motor and at least one engine. The powertrain may be operable by the control means in an electric vehicle (EV) mode in which the at least one engine remains switched off and the at least one electric propulsion motor is operable to deliver drive torque and a boost mode in which the at least one engine is switched on to provide additional power to drive the vehicle as required. The control means may be operable to allow a driver to set a target vehicle speed and to control the powertrain to maintain the target vehicle speed. Optionally, when in EV mode the control means may be further operable to determine whether a boost location exists ahead of the vehicle. The boost location may be a location at which a gradient of a driving surface is sufficiently high to require assumption of the boost mode in order to maintain the target vehicle speed. The control means may be operable to command starting of the at least one engine before the boost location is reached.

Within the scope of this application it is envisaged that the various aspects, embodiments, examples and alternatives, and in particular the individual features thereof, set out in the preceding paragraphs, in the claims and/or in the following description and drawings, may be taken independently or in any combination. For example features described in connection with one embodiment are applicable to all embodiments, unless such features are incompatible.

For the avoidance of doubt, it is to be understood that features described with respect to one aspect of the invention may be included within any other aspect of the invention, alone or in appropriate combination with one or more other features.

BRIEF DESCRIPTION OF THE DRAWINGS

Embodiments of the invention will now be described with reference to the accompanying drawings in which.

DETAILED DESCRIPTION

Figure 1:
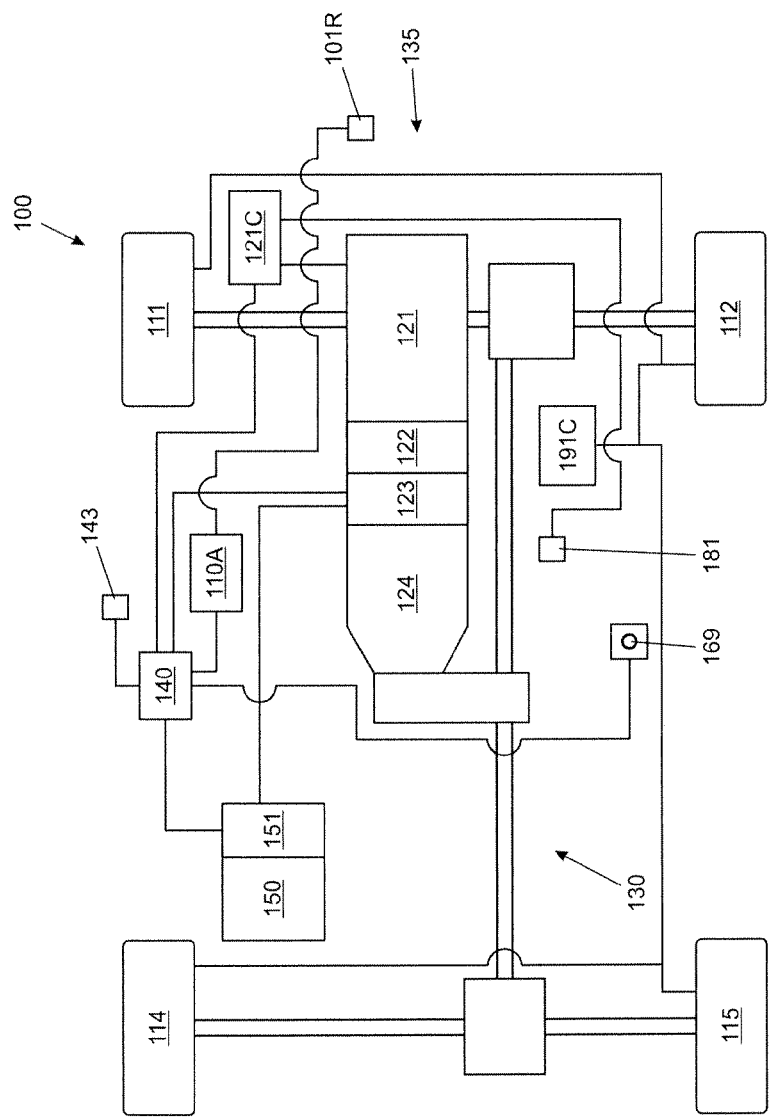
FIG. 1 is a schematic illustration of a hybrid electric vehicle (HEV) according to an embodiment of the present invention.

FIG. 1 shows a hybrid electric vehicle (HEV) 100 according to an embodiment of the present invention. The vehicle 100 has an internal combustion engine 121 and associated engine controller 121C. The engine 121 is releasably coupled to a crankshaft integrated motor/generator (CIMG) 123 by means of a clutch 122. The CIMG 123 is in turn coupled to an automatic transmission 124. It is to be understood that in some embodiments the transmission 124 may be a manual transmission instead of an automatic transmission. The transmission may comprise a manual gearbox, a continually variable transmission or any other suitable transmission. It is to be further understood that other electric machines are also useful as well as or instead of a CIMG. The electric machine may be situated at any suitable position in the powertrain, for example in a rear drive unit such as a rear differential, particularly in front engined vehicles and a front drive unit such as a front differential, particularly in the case of rear engined vehicles, or any other suitable location.

The transmission 124 is coupled in turn to a driveline 130. The driveline 130, transmission, CIMG 123, clutch 122 and engine 121 may be referred to collectively as a powertrain 135.

The powertrain 135 is operable to provide drive torque to the transmission 124 by means of the engine 121 alone, the CIMG 123 alone or the engine 121 and CIMG 123 in parallel. The vehicle 100 may therefore be referred to as a parallel-type hybrid vehicle. However, it is to be understood that embodiments of the present invention are also suitable for use with series-type hybrid vehicles in which only one or more electric machines are operable to provide motive torque, i.e. operable as propulsion motors.

In series-type hybrid vehicles an engine is provided for generating charge to power the one or more electric machines and not for providing direct drive torque. In some series-type hybrid vehicles the engine may be employed to generate charge to drive the one or more electric machines as propulsion motors whilst the motors are providing propulsion to the vehicle in addition to or instead of a battery of the vehicle in order to enable more power to be delivered to the motors. Embodiments of the invention are also useful in hybrid vehicles having a powertrain 135 that is operable in either of a parallel or series mode.

It is to be understood that embodiments of the present invention are suitable for use with vehicles having a variety of powertrain arrangements including vehicles in which the transmission 124 is arranged to drive only a pair of front wheels 111, 112 or only a pair of rear wheels 114, 115, i.e. front wheel drive or rear wheel drive vehicles in addition to four wheel drive, all wheel drive or selectable two wheel drive/four wheel drive vehicles. Embodiments of the invention are also suitable for vehicles having fewer than four wheels or more than four wheels.

The vehicle 100 has a battery 150 connected to an inverter 151 that generates a three-phase electrical supply that is supplied to the CIMG 123 when the CIMG 123 is operated as a motor. The battery 150 is also arranged to receive charge from the CIMG 123 when the CIMG 123 is operated as a generator. In the present embodiment the CIMG 123 may be operated as a generator driven by the engine 121 or by vehicle inertia in order to provide regenerative braking functionality. A brake controller 191C is arranged to control application of friction braking and/or regenerative braking according to a brake control methodology. According to this methodology, if the amount of required braking such as driver demanded braking can be met by regenerative braking, regenerative braking is employed. If it cannot, then friction braking is employed.

The powertrain 135 is configured to operate in one of a hybrid electric vehicle (HEV) mode, an EV inhibit mode and a selectable electric vehicle only (EV-only) mode according to the state of a HEV mode selector 169.

In the HEV mode of operation the powertrain 135 is arranged to operate in one of a parallel boost mode, a parallel recharge mode, a parallel 'idle' mode and a vehicle-selected EV mode.

In the parallel boost mode the engine 121 and CIMG 123 both apply positive torque to the transmission 124 (i.e. clutch 122 is closed) to drive the vehicle 100. In the parallel recharge mode the engine 121 applies a positive torque whilst the CIMG 123 applies a negative torque whereby charge is generated by the CIMG 123 to charge the battery 150. In the parallel idle mode the engine 121 applies a positive torque (or negative compression braking torque) whilst the CIMG 123 applies substantially no torque. It is to be understood that parallel idle mode is distinct from an engine idle mode in which the engine runs at an idle speed. In the vehicle-selected EV mode (and in the driver selected EV-only mode) the clutch 122 is opened and the engine 121 is switched off.

The vehicle 100 has a controller 140 configured when the vehicle is in the HEV mode of operation to control the powertrain 135 to operate in the parallel boost mode, parallel recharge mode, parallel 'idle' mode or vehicle-selected EV mode according to an energy management strategy implemented by the controller 140. The energy management strategy may also be referred to as a HEV control methodology.

It is to be understood that when the powertrain 135 is in HEV mode the controller 140 is configured to determine a target torque that is to be developed by each of the engine 121 and CIMG 123 at least in part in dependence on an amount of driver demanded torque at a given moment in time. The controller 140 then causes the engine 121 and CIMG 123 to apply the respective target torques to an input shaft of the transmission 124. For example, if the controller 140 determines that operation in vehicle-selected EV mode is required, the controller 140 sets the target torque from the engine 121 to zero and provides a control signal to switch off the engine 121. If the controller 140 determines that both the engine 121 and CIMG 123 are required to apply positive torque to the driveline 130 the controller 140 controls the engine 121 and CIMG 123 to provide the required values. If the controller 140 determines that the battery 150 is required to be charged, the CIMG 123 is controlled to apply a prescribed negative torque to the driveline 130 whereby the CIMG 123 acts as a generator to generate charge to charge the battery 150.

It is to be understood that other arrangements may also be useful.

If the driver selects operation in the EV inhibit mode, the controller 140 is configured not to allow automatic stopping of the engine 121. Rather, the controller 140 maintains the engine 121 running throughout the course of a drivecycle. In some embodiments, in EV inhibit mode the vehicle is controlled such that the when drive torque is required the drive torque is delivered by the engine 121 alone or the engine 121 in combination with the CIMG 123.

If the driver selects operation of the vehicle 100 in EV-only mode and the engine 121 is running, the vehicle 100 is configured to open the clutch 122 and to switch off the engine 121. Again, the CIMG 123 is then operated either as a motor or as a generator. It is to be understood that the CIMG 123 may be arranged to act as a generator in the EV-only mode in order to effect regenerative braking of the vehicle 100 and emulate engine over-run/compression braking torque.

The vehicle has an adaptive cruise control (ACC) system 110A operable to implement an adaptive cruise control methodology. The ACC system 110A is operable to allow a driver to set a target speed target_speed being a speed that the ACC system 110A will seek to control the vehicle 100 to maintain in the absence of slower traffic ahead of the vehicle 100. The vehicle 100 may be referred to as a 'host' vehicle 100 since it hosts the ACC system 110A.

When the host vehicle 100 is behind a followed vehicle the system 110A is configured to allow a driver to set a driver desired distance d_driver from the followed vehicle being the distance the driver wishes to maintain behind the followed vehicle subject to the limitation that the speed of the host vehicle is not to exceed the target speed target_speed. In a normal (or conventional) cruise mode of operation, the ACC system 110A is arranged to maintain a distance behind the followed vehicle that is substantially equal to d_driver. The ACC system 110A determines the distance between the host vehicle 100 and followed vehicle by means of a radar module 101R.

In the present embodiment, the driver selects the driver desired distance d_driver from one of three distance settings (setting 1, setting 2 or setting 3) corresponding to successively greater following distances. The actual value to which d_driver is set depends on whether setting 1, setting 2 or setting 3 is selected by the driver and the speed of the vehicle 100. The greater the speed of the vehicle, the greater the value of d_driver set by the system 110A for a giving setting (i.e. setting 1, 2 or 3). Other arrangements are also useful, such as other numbers of settings. In some embodiments only one setting is available, whilst in others a plurality of settings are available.

In some embodiments, in addition or instead the ACC system 110A may be operable to allow the driver to command the system 110A to maintain a distance behind the followed vehicle 100' corresponding to a current distance of the following (or host) vehicle 100 behind the followed vehicle 100', i.e. d_driver is set to the current distance behind the followed vehicle 100'. The value of d_driver set in this manner may subsequently be changed or adjusted by the system 110A as a function of speed of the vehicle 100 in some embodiments.

The ACC system 110A is also operable in an economy (or ECO) mode of operation. In this mode the ACC system 110A seeks to maintain operation of the vehicle 100 using the most efficient means for longer than might otherwise be the case in a non-ECO mode. In order to accomplish this, when operating in ECO mode the ACC system 110A is arranged to modify or adapt one or more gear shift maps employed by the powertrain 135 in order to increase a likelihood that an amount of torque that may be developed by the powertrain 135 when in EV mode will be sufficient to provide required or adequate vehicle performance such as a required or adequate rate of acceleration. Furthermore, the ACC system 110A may be arranged to limit a rate of acceleration that it is permitted to demand from the powertrain 135. This has the advantage that a risk that the powertrain switches from EV mode to a parallel mode, requiring running of a fuel burning propulsion motor such as engine 121, may be reduced.

By adequate vehicle performance is included an ability to deliver at least a minimum rate of acceleration under a given one or more conditions.

In some embodiments, if the ACC system 110A is operating in the economy mode and operation in a parallel mode is mandated, the powertrain 135 may be configured to continue to employ the same or a similar gear shift map as it employs when operating in EV mode. It is to be understood that other arrangements may also be useful.

When the vehicle 100 is operating in driver-selected EV mode and the ACC system 110A is operating in ECO mode, the controller 140 is configured to implement a methodology for predicting in advance a requirement to start the engine 121 due to the presence of an incline ahead of the vehicle 100 as discussed in more detail below. That is, the controller 140 seeks to predict when it may be required to operate in a parallel mode such as the parallel boost mode in order to deliver sufficient torque to maintain a target speed set by the ACC system 110A and avoid a dip in the acceleration profile of the vehicle. The controller 140 is further operable to start the engine 121 in advance of the time (or location) at which engine start is expected to be required so that the engine 121 is ready to deliver the required torque at the required time or location. In some embodiments, if an engine start 121 is required in order to meet drive torque demand when operating in EV mode, the controller 140 causes the vehicle to operate in the parallel boost mode wherein the engine 121 and CIMG 123 both provide drive torque, i.e. the CIMG 123 continually delivers drive torque whilst the engine 121 is caused to supplement the amount of drive torque delivered by the CIMG 123. This can result in a reduction in NVH associated with a transition from EV mode to a parallel mode. That is the amount of NVH associated with a transition from EV mode to a parallel boost mode may be less than that associated with a transition from EV mode to another parallel mode such as parallel idle mode or parallel recharge mode. It is to be understood that in some embodiments the controller 140 may be configured to cause the vehicle (or powertrain) to assume the parallel boost mode even under circumstances where the engine 121 is capable of delivering the required drive torque with the CIMG 123 idling, and/or with the CIMG operating as a generator. This feature may offer the advantage of reduced NVH as stated above.

In some embodiments the controller 140 may be configured to implement this predictive methodology whenever the vehicle is operating in an EV mode, regardless of whether the ACC system 110A is operating in ECO mode or a normal mode. In some embodiments the controller 140 may be configured to implement the methodology whenever the vehicle is operating in an EV mode even if the ACC system 110A is not in use. In embodiments in which the controller 140 may implement the methodology with the ACC system 110A switched off, the controller 140 may consider the value of 'target_speed' to correspond to a current or a desired speed of the vehicle and determine whether that current or desired speed can be maintained without switching to a parallel mode.

The controller 140 is provided with access to data in respect of an altitude of a driving surface along a route the vehicle is following and data in respect of a current location of the vehicle 100. In the present embodiment location information is provided by means of a global positioning system (GPS) device 143. Other location determination means are also useful, such as cellular network-based systems, for example general packet radio service (GPRS)-based systems or the like. Data in respect of a gradient ahead of the controller 140 may be provided by means of a database such as an ADASIS (Advanced Driver Assistance Systems Interface Specifications) database or like database. In some embodiments the controller 140 may be configured to calculate a gradient of a driving surface by means of a gradient estimation function in combination with surface height data. The controller 140 may also be provided with data corresponding to vehicle weight. In some embodiments the controller 140 may employ a weight estimation function. The weight estimation function may estimate vehicle weight by reference to one or more vehicle parameters such as actual rate of acceleration for a given powertrain torque, selected gear and surface gradient. Other arrangements may also be useful.

The controller 140 is configured to process data in respect of the route the vehicle 100 is following and to determine whether an inclination of the driving surface up to a prescribed distance ahead of the vehicle 100 is such that operation of the vehicle 100 in a parallel mode will be required. The determination as to whether an engine start will be required may take into account one or more parameters associated with the route, for example whether a speed limit is imposed on the route, and a current speed of the vehicle. The controller 140 may be configured to assume that the vehicle 100 will maintain a current speed unless a change in speed limit is detected ahead of the vehicle. Where a change in speed limit is detected the controller 140 may be configured to assume that the vehicle 100 will travel at the new speed limit once the vehicle has passed the location at which the speed limit changes.

If the vehicle 100 is following another vehicle (the 'followed vehicle') the controller 140 may be configured to assume that the vehicle 100 will maintain the current speed unless a change in speed limit occurs ahead of the vehicle. If such a change in speed limit is detected the controller 140 may be configured to assume that the followed vehicle will drive at the speed limit imposed on the route once the speed limit has changed, and therefore that the speed of the host vehicle 100 will change accordingly. Other arrangements may also be useful.

It is to be understood that in some embodiments, where a speed limit ahead of the vehicle 100 increases the controller 140 may be configured to take into account the fact that a driver may wish to accelerate to the new speed limit even if the driving surface is upwardly inclined at the location at which the speed limit increases such that the vehicle 100 would be required to accelerate uphill. The controller 140 may determine that operation in a parallel mode will be required in order to permit such acceleration even if such operation would not be required if the vehicle were not required to accelerate, but was already travelling at the new (higher) speed limit.

If the controller 140 determines that operation in a parallel mode is likely to be required, the controller 140 is configured to determine at what location of the route operation in a parallel mode will be required. This location will be referred to as a boost location.

The controller 140 then determines a length of time required for torque delivery from the engine 121 to the driveline 130 to take place, from the moment operation in a parallel mode is commanded, when operating in EV. This period may be referred to as a 'time to torque period', time_to_torque. Thus it is to be understood that in the present embodiment the time_to_torque period includes the time required for the clutch 122 to be closed, connecting the engine 121 to the driveline 130, rather than only the time to start the engine and increase engine speed to a desired value.

In some embodiments, in order to determine the length of the time_to_torque period, the controller 140 determines how long the engine 121 should be allowed to run in advance of delivering drive torque in order to warm to a sufficiently high temperature to efficiently provide drive torque. This period may be referred to as a 'time to warm' period, time_to_warm. The time_to_warm period may be a substantially fixed period, or a period determined responsive to one or more parameters such as current engine coolant or oil temperature, ambient temperature and vehicle speed.

It is to be understood that in some embodiments the controller may determine a rate of cooling of the engine 121 from its current temperature, and a rate of warming of the engine 121 once the engine 121 is restarted, in order to determine the time_to_warm period. The temperature at which torque may be efficiently provided may be a substantially fixed temperature, or a temperature that is dependent on one or more of the above mentioned parameters.

In some embodiments the time_to_warm period may be a substantially fixed period regardless of ambient temperature and current temperature. In some alternative embodiments the time_to_warm period may be dependent on current coolant temperature regardless of ambient temperature, or responsive to an amount of time that has elapsed since the engine was last switched off. Other arrangements may also be useful.

In some embodiments the controller 140 takes account of the temperature of an engine aftertreatment apparatus in order to ensure that a catalytic converter is at a sufficiently high temperature to achieve required aftertreatment operation when engine torque delivery is required. In vehicles having an aftertreatment apparatus indicator lamp or other signal indicating the aftertreatment apparatus is not at a sufficiently high temperature the controller 140 may seek to ensure that this signal indicates that the apparatus is at a sufficiently high temperature before engine torque delivery is required.

In the present embodiment the controller 140 also takes into account an amount of time required for the engine 121 to be accelerated to a speed matching the speed of the CIMG 123, before the clutch 122 is closed, and the time required for the clutch 122 to close. This period may be referred to as a time_to_connect period. It is to be understood that the time_to_torque period may be considered to be the sum of the time_to_warm period and the time_to_connect period. Thus in the present embodiment the time_to_warm period includes the time required to start the engine from stationary. Other arrangements may also be useful.

It is to be understood that in some embodiments no engine warming period is included. Thus the time_to_torque period corresponds to the sum of the time required to start the engine, and the time_to_connect period.

Once the time_to_torque period has been determined, the controller 140 determines a location at which engine start should be commanded in order to allow a period of time substantially equal to the time_to_torque period to elapse before the boost location is reached. In some embodiments the controller 140 is arranged to command an engine start at a time in advance of reaching the boost location that is substantially equal to the time_to_torque period plus a delay offset period delay_period. The delay offset period may be useful in accommodating any difference between the actual time (and distance) required to warm the engine and the value of time_to_torque determined by the controller 140. It may also be useful in accommodating any difference between the actual location at which operation in a parallel mode is required and the boost location as determined by the controller 140. Thus a risk that the powertrain is not already in a parallel mode when the actual location at which operation in a parallel mode is required may be reduced.

It is to be understood that in the present embodiment, although the controller 140 prepares to operate the vehicle 100 in the parallel boost mode when the boost location is reached, in some embodiments the controller 140 may only command delivery of torque from the engine 121 when an amount of torque demanded from the powertrain by the ACC controller 110A or driver (via the accelerator pedal 181) exceeds that which may be provided by the CIMG 123 alone substantially at that moment in time. Other arrangements are also useful.

It is to be understood that if the controller 140 has correctly determined the value of distance_to_torque, the controller 140 may control the vehicle to couple the engine 121 to the transmission 124 by closing the clutch 122 at or immediately before the boost location is reached. Thus, it is ensured that when the additional torque from the engine 121 is required, the clutch 122 is already closed. This has the advantage that in some embodiments noise, vibration and/or harshness (NVH) associated with engine starting and clutch closure may be reduced, particularly when operating in high torque demand situations.

Some embodiments of the invention have the advantage that drive torque from the engine 121 may be provided more quickly in some embodiments, since a delay in delivering torque due to engine starting and clutch closure after reaching a location at which a parallel mode is required may be substantially eliminated. Furthermore, some embodiments of the invention have the advantage that powertrain service life may be enhanced. This is at least in part because some embodiments of the invention are arranged to ensure the engine 121 has sufficient time to warm to a prescribed temperature before the engine 121 is connected to a driveline 130 and required to provide drive torque to drive the vehicle 100. Embodiments of the invention provide a vehicle with increased drivability due to the ability to deliver substantially continuous acceleration capability through the location where the gradient is such as to require operation in a parallel mode.

In some embodiments the controller 140 is configured to command operation in a parallel mode when it is determined that the distance of the vehicle from a boost location is less than or substantially equal to the value of distance_to_torque. Provided the value of torque demanded from the powertrain is still less than the value required to assume a parallel mode, the controller allows the engine to warm and closes the clutch 122 as described above. If at any time during this period the amount of torque demanded by the powertrain exceeds that which may be provided by the CIMG 123 alone, the controller 140 commands closure of the clutch 122 with no further engine warming performed. Other arrangements may also be useful.

In some embodiments, the controller 140 is arranged to determine when an engine start should be commanded by determining substantially continuously the value of the time_to_torque period. The controller 140 converts this time period into a distance and determines whether a boost location exists within this distance ahead of the vehicle 100 at any given moment in time. If the controller 140 determines that such a location exists the controller 140 is configured to command operation in a parallel mode and therefore to command starting of the engine 121 substantially immediately. That is, if a distance of the vehicle 100 from the boost location is less than the distance required in order to allow the time_to_torque period to elapse before reaching the boost location, the controller 140 commands operation in a parallel mode and therefore starting of the engine 121, warming of the engine 121 (and as a consequence warming also of an engine aftertreatment system) and subsequent closure of the clutch 122.

Figure 2:
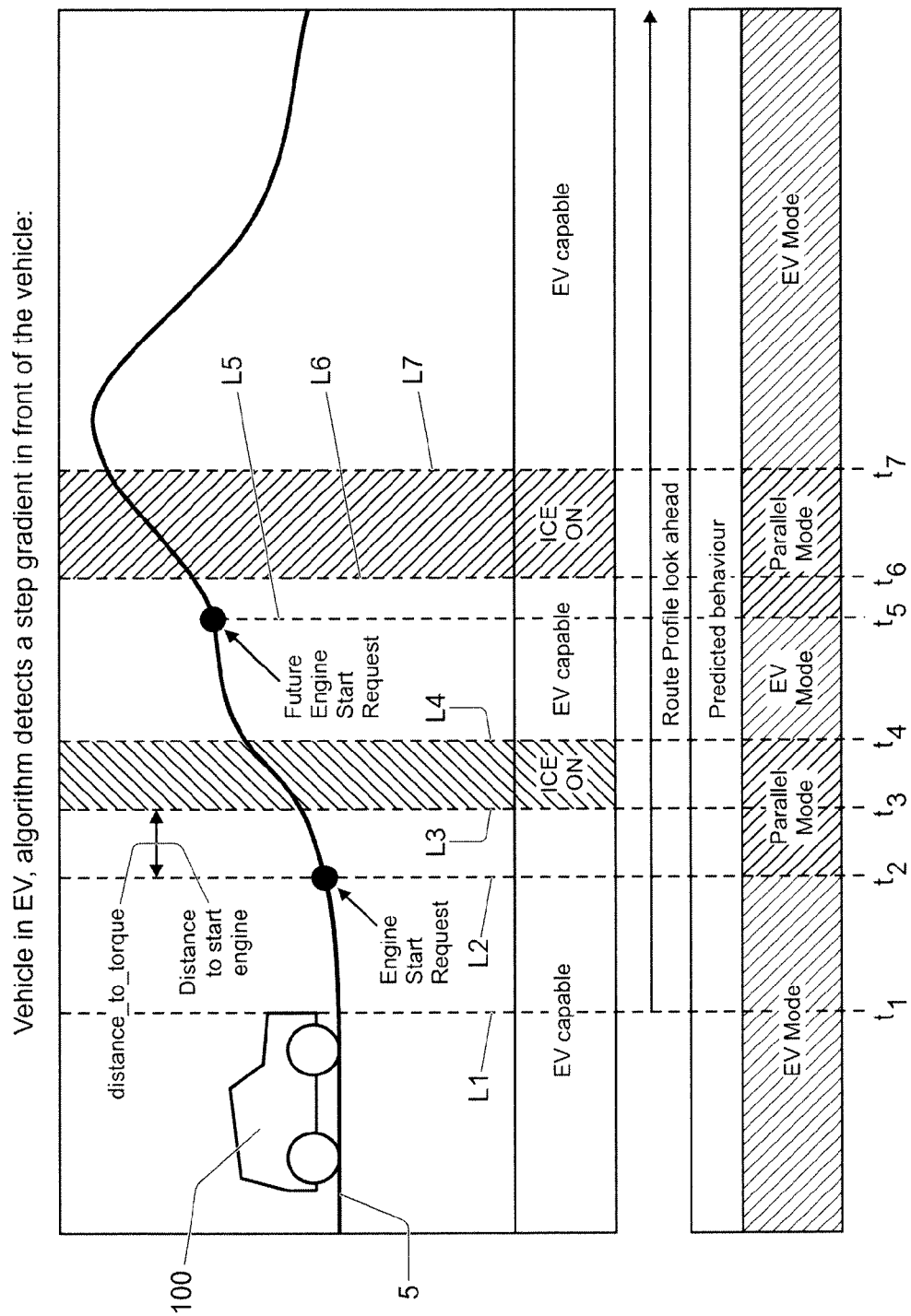
FIG. 2 is a schematic illustration of a method of operation of a hybrid electric vehicle according to an embodiment of the present invention.

FIG. 2 is a schematic illustration showing a vehicle 100 having this functionality driving along a road 5 shown in cross-section (not to scale). It can be seen that the vehicle is at a location L1 at time t1.

When operating in EV mode with the ACC system 110A in ECO mode, the controller 140 monitors continuously a temperature of the engine coolant and a speed of the CIMG 123. The controller 140 uses this information to determine a value of the parameters time_to_warm and time_to_connect, and therefore of the parameter time_to_torque. That is, the time required for (i) the engine 121 to be started, (ii) the engine 121 to be warmed to a prescribed temperature (this time period being calculated by the controller in dependence on a current value of engine temperature (as determined with reference to engine coolant temperature), the value then being stored in a memory of the controller 140), (iii) the engine speed to increase to a value matching the speed of CIMG 123, and (iv) the clutch 122 subsequently to be closed to connect the engine 121 to the CIMG 123. Once the value of time_to_torque has been calculated, the controller 140 determines the distance that will be travelled by the vehicle 100 in this time period, distance_to_torque, and subsequently whether an engine start is likely to be required within this distance ahead of the vehicle's current location. It is to be understood that in some embodiments, in addition to or instead of monitoring engine coolant temperature the controller 140 may monitor the temperature of an engine aftertreatment apparatus or system in order to determine the parameter time_to_warm.

The controller 140 determines whether an engine start is likely to be required by analysing data in respect of an altitude of the road 5 ahead of the vehicle 100 within a distance distance_to_torque and calculates a gradient of the road 5 over this distance. If the gradient exceeds a prescribed gradient the controller 140 begins a torque delivery preparation procedure. Data in respect of gradient may be provided by a map based system, the vehicle being provided with data in respect of location as described elsewhere herein.

In the example of FIG. 2, the controller 140 of vehicle 100 determines at location L1 that operation in a parallel mode is not required within a distance distance_to_torque of its current location. The vehicle continues to location L2 (arriving at time t2), calculating an updated value of distance_to_torque repeatedly and checking whether a gradient exists requiring operation in a parallel mode within a distance distance_to_torque of the current location. At location L2 the controller 140 determines that a gradient does exist requiring operation in a parallel mode a distance less than or equal to distance distance_to_torque from its current location. That is, when at location L2 the controller 140 determines that location L3, which is within a distance distance_to_torque of L2, corresponds to a boost location. The controller 140 immediately commences the torque delivery preparation procedure. In the present embodiment the controller 140 does this by commanding operation in a parallel mode.

According to the torque delivery preparation procedure, the controller 140 commands starting of the engine 121. Once the engine 121 has warmed to that temperature the controller 140 commands connection of the engine 121 to the CIMG 123 by means of the clutch 123.

In some embodiments the controller 140 is configured to provide a control signal to command operation in a parallel mode responsive to which a different controller provides one or more control signals to start the engine 121, and one or more control signals to close the clutch 122. Thus in some embodiments a different controller receives the signal to operate in a parallel mode and performs the torque delivery procedure. Other arrangements may also be useful.

It is to be understood that the controller 140 may be configured to implement a hysteresis function in respect of determination of the distance to start the engine 121, in order to account for errors in vehicle location determination associated with the GPS device 143 as the vehicle is driven. Thus, if the controller 140 determines that a gradient requiring engine starting is present within a distance distance_to_torque ahead of the vehicle's location in a direction of travel of the vehicle but subsequently, before reaching the boost location determines that such a gradient is not within the distance distance_to_torque, the controller 140 is configured not to cancel immediately the request to start the engine 121, or shut down the engine 121 if the engine 121 has already been started. Rather, the controller 140 waits to see whether a subsequent determination is made that such a gradient is within the distance distance_to_torque, and whether the subsequent determination is made within a prescribed distance or time of the initial determination that an engine start is required. If such a determination is made within the prescribed distance or time, the controller 140 continues with the torque delivery procedure. Otherwise, the controller 140 commands shutdown of the engine 121 when the prescribed period has elapsed. It is to be understood that this scenario may be useful for example if a driver suddenly changes the route being followed by the vehicle, for example by turning off the road 5.

In the example of FIG. 2 the vehicle 100 continues to location L3, arriving at time t3, with the ACC system 110A operating in ECO mode and without the driver demanding increased torque. At location L3, the controller connects the engine 121 to the CIMG 123 and continues to monitor torque demand by the ACC system 110A. At location L3 the ACC system 110A demands increased torque due to the presence of a sufficiently steep incline from location L3 to location L4. The controller responds to the increased demand for torque by controlling the engine 121 to deliver torque boost to the CIMG 123. In some alternative embodiments, positive torque delivery by the CIMG 123 may be terminated and the engine 121 alone caused to meet drive torque demand. The CIMG 123 may then be caused to idle, or to apply negative torque to the engine 121 to generate electrical charge.

As the vehicle 100 travels from location L3 to location L4, the controller 140 continues to monitor an inclination of the road 5 ahead of the vehicle 100. However, because the powertrain 135 is now operating in the parallel boost mode, the controller 140 monitors gradient ahead of the vehicle to determine when to switch off the engine 121 and return the powertrain to EV mode.

In order to accomplish this the controller 140 monitors the gradient within a prescribed distance distance_EV_location ahead of the vehicle 100 to detect a location having a gradient sufficiently low to allow operation of the powertrain 135 in EV mode at the required speed. This location may be referred to as an EV location. In some embodiments this is accomplished by the controller 140 by continuing to monitor gradient within a distance distance_to_torque of the current location of the vehicle, the value of distance to torque being calculated based on a stationary engine, optionally a stationary engine at ambient temperature or further optionally a fixed, prescribed temperature value. In some embodiments the value of distance to torque may be a fixed value that depends on a speed of the vehicle. Thus in some embodiments the value of distance_EV_location corresponds substantially to the value of distance_to_torque.

If an EV mode location is detected within a distance distance_EV_location, the controller 140 then determines whether a gradient exists within a prescribed distance ahead of that location which would require the powertrain 135 to resume operation in the parallel boost mode if the powertrain were to switch to EV mode at the EV mode location. Thus the controller 140 determines whether a boost location exists within a prescribed distance ahead of the next EV mode location. This prescribed distance may be referred to as a distance distance_future_torque. In some embodiments the value of distance_future_torque is different from the value of distance_to_torque, typically a greater value in some embodiments.

It is to be understood that the reason for monitoring a distance of the next boost location ahead of the next EV mode location is to reduce a risk of mode chattering. Mode chattering is a phenomenon in which a powertrain 135 switches repeatedly between modes such that the engine 121 is switched between on and off states more than once in relatively rapid succession. By determining the value of distance_future_torque, the vehicle 100 may determine whether to switch off the engine 121 at the next EV location and switch the engine 121 back on when the distance from the next boost location falls below a value of distance_to_torque. In some embodiments therefore, if the value of distance_future_torque is less than a prescribed value, the controller 140 commands the engine 121 to remain switched on even after the vehicle 100 passes the next EV mode location.

In FIG. 2 it can be seen therefore that prior to time t1 the vehicle is operated in EV mode. At time t2 the controller 140 determines that the distance to the next boost location is less than a current value of distance_to_torque and therefore commands starting of the engine 121. Between times t2 and t3 the powertrain 135 operates in parallel mode with the engine 121 delivering substantially no torque to the CIMG 123, whilst between times t3 and t4 the powertrain 135 operates in the boost mode. Location L4, reached at time t4, is the first EV mode location after location L3 for which no boost location exists within a distance distance_future_torque ahead thereof.

It is to be understood that between times t3 and t4 the powertrain 135 operates in a parallel mode.

At time t4 the powertrain 135 resumes operation in EV mode as described above.

At time t5 the controller 140 determines that the distance to the next boost location is less than the value of distance_to_torque and therefore commands starting of the engine 121. The powertrain 135 therefore assumes operation in parallel mode. Just before time t6 the controller 140 closes clutch 122 and the powertrain 135 is ready to deliver additional drive torque by means of the engine 121. Accordingly at time t6 when the ACC system 110A demands more torque than can be provided by the CIMG 123 alone, the powertrain 135 assumes boost mode and the engine 121 delivers drive torque.

At location L7, which is reached at time t7, the controller 140 determines that the vehicle has reached an EV mode location for which no boost location exists within a distance distance_future_torque ahead thereof. The controller 140 therefore controls the powertrain 135 to resume operation in EV mode.

It is to be understood that the distance distance_future_torque may be dependent on vehicle speed in some embodiments. Other arrangements may also be useful.

Figure 3:
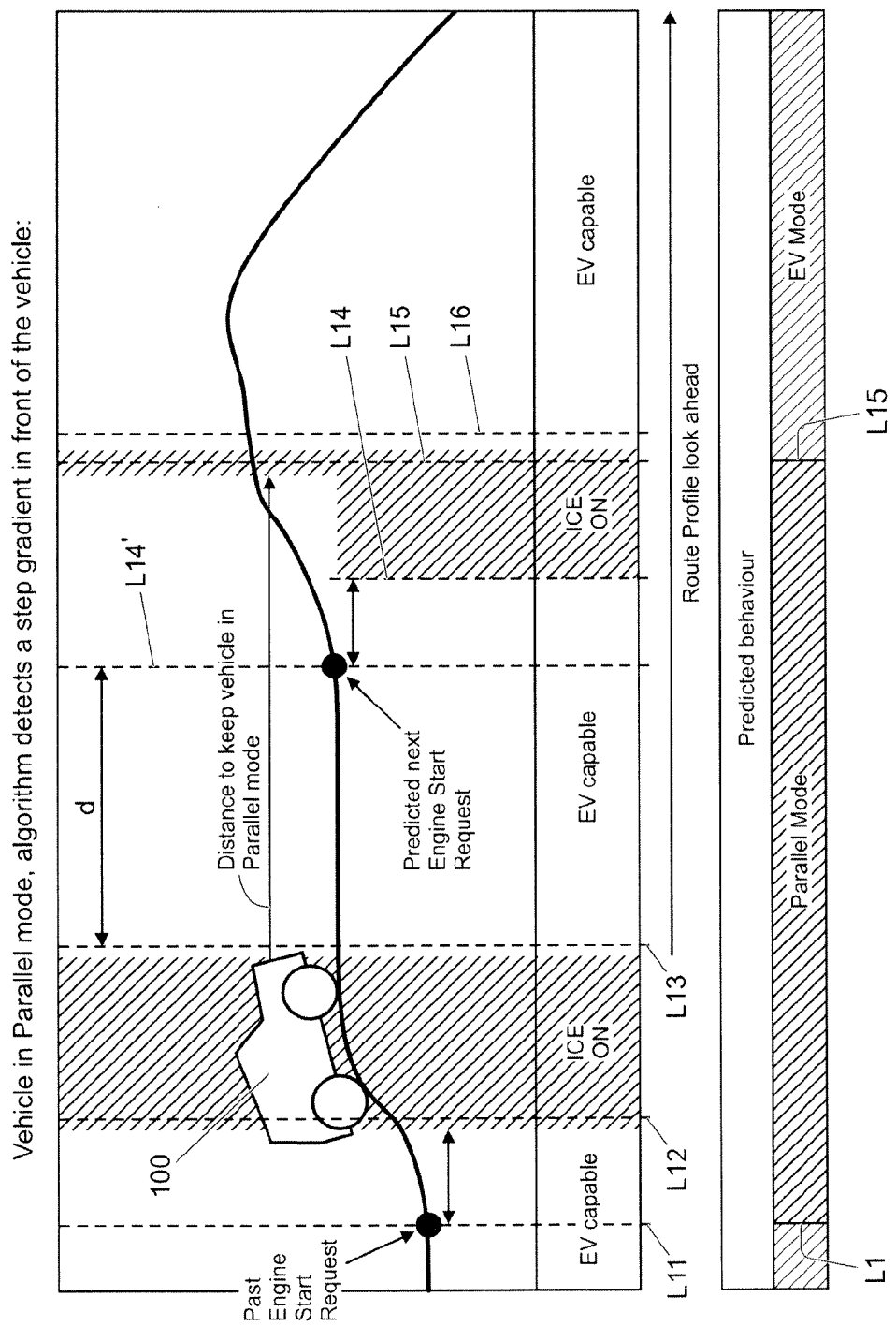
FIG. 3 is a schematic illustration of a method of operation of a hybrid electric vehicle according to an embodiment of the present invention.

FIG. 3 shows a scenario in which the vehicle 100 remains in the parallel mode even during a period when the powertrain 135 is capable of operation in EV mode.

At location L11 of the vehicle 100 the controller 140 determines that a boost location L12 is within a distance time_to_torque of the present location. The controller 140 therefore controls the powertrain 135 to start the engine 121. As the vehicle 100 continues its journey, the controller 140 determines that the next EV mode location is at location L13. However the controller 140 also determines that the next boost location after location L13 (i.e. location L14) is at a distance d ahead of location L13 which is less than a value distance_future_torque. The controller 140 therefore does not command assumption of EV mode when the vehicle 100 passes location L13. Rather, the controller 140 commands the powertrain 135 to remain in the parallel mode, i.e. the engine 121 remains switched on, whilst the vehicle 100 drives to location L14.

In some alternative embodiments the controller 140 determines a distance to the next location at which switching on of the engine 121 would be required in order to prepare the engine 121 to deliver torque at the next boost location. That is, the distance to location L14' of FIG. 3, which is located before location L14. If the distance to location L14' is less than a prescribed value, the controller 140 prevents the engine 121 from being switched off before the vehicle 100 arrives at boost location L14.

When the vehicle arrives at location L14, as anticipated the ACC system 110A commands an amount of torque from the powertrain 135 that exceeds that which may be delivered from the CIMG 123 alone. Accordingly, the controller 140 controls automatically the powertrain 135 to deliver boost drive torque by means of the engine 121 as well as the CIMG 123.

As described above with reference to FIG. 3, as the vehicle 100 continues in the parallel boost mode, the controller 140 determines whether the next EV mode location lies within a certain distance of the vehicle's present location, and whether the next boost location after the next EV mode location is also within a certain distance. It is to be understood that in some embodiments the controller 140 may only be capable of analysing data a certain distance ahead of the vehicle.

When the controller 140 identifies the next EV mode location, and determines that the engine 121 should be switched off at the next EV mode location, the controller 140 is arranged further to determine whether the engine 121 may be switched off in advance of the next EV mode location without an excessive fall in speed of the vehicle 100.

It is to be understood that in some scenarios, for example as the vehicle 100 approaches a brow of a hill as it travels uphill, it may be possible to control the powertrain 135 to assume EV mode in advance of a location at which a gradient of the driving surface is below that requiring operation in a parallel mode, with only a relatively small reduction in vehicle speed. This is because a value of momentum of the vehicle 100 may be sufficient to enable it to reach the EV mode location with the engine 121 already switched off without losing an excessive amount of momentum. Accordingly, the controller 140 is arranged to determine a location early_EV_distance ahead of the EV mode location at which, if EV mode were assumed at that location, a drop in speed of the vehicle 100 before reaching the EV mode location would be less than a prescribed threshold value max_speed_drop. In the present embodiment, the controller 140 also checks that the vehicle speed is above a threshold min_speed and that the vehicle is not decelerating, before resuming EV mode ahead of the EV mode location.

With reference to FIG. 3, the controller 140 determines that the next EV mode location after boost location L14 is at location L16. The controller 140 subsequently determines whether the vehicle speed currently exceeds a threshold value min_speed, and whether the vehicle is decelerating. If the vehicle speed does exceed min_speed and the vehicle is not decelerating, the controller determines whether a drop in speed between the vehicle's current location and the next EV mode position would exceed a value max_speed_drop.

If the controller determines that the drop in speed would not exceed the value max_speed_drop, the controller 140 commands assumption of the EV mode.

In the example of FIG. 3, the controller determines at location L15 that each of these conditions is met and therefore commands assumption of EV mode at location L15, ahead of EV mode location L16.

Thus when the vehicle 100 reaches location L15, the controller 140 determines that the vehicle speed is above the value min_speed, the vehicle is not decelerating, and the expected drop in vehicle speed between location L15 and EV mode location L16 is less than max_speed_drop. The controller 140 therefore controls the powertrain 135 to assume EV mode at location L15.

Figure 4:
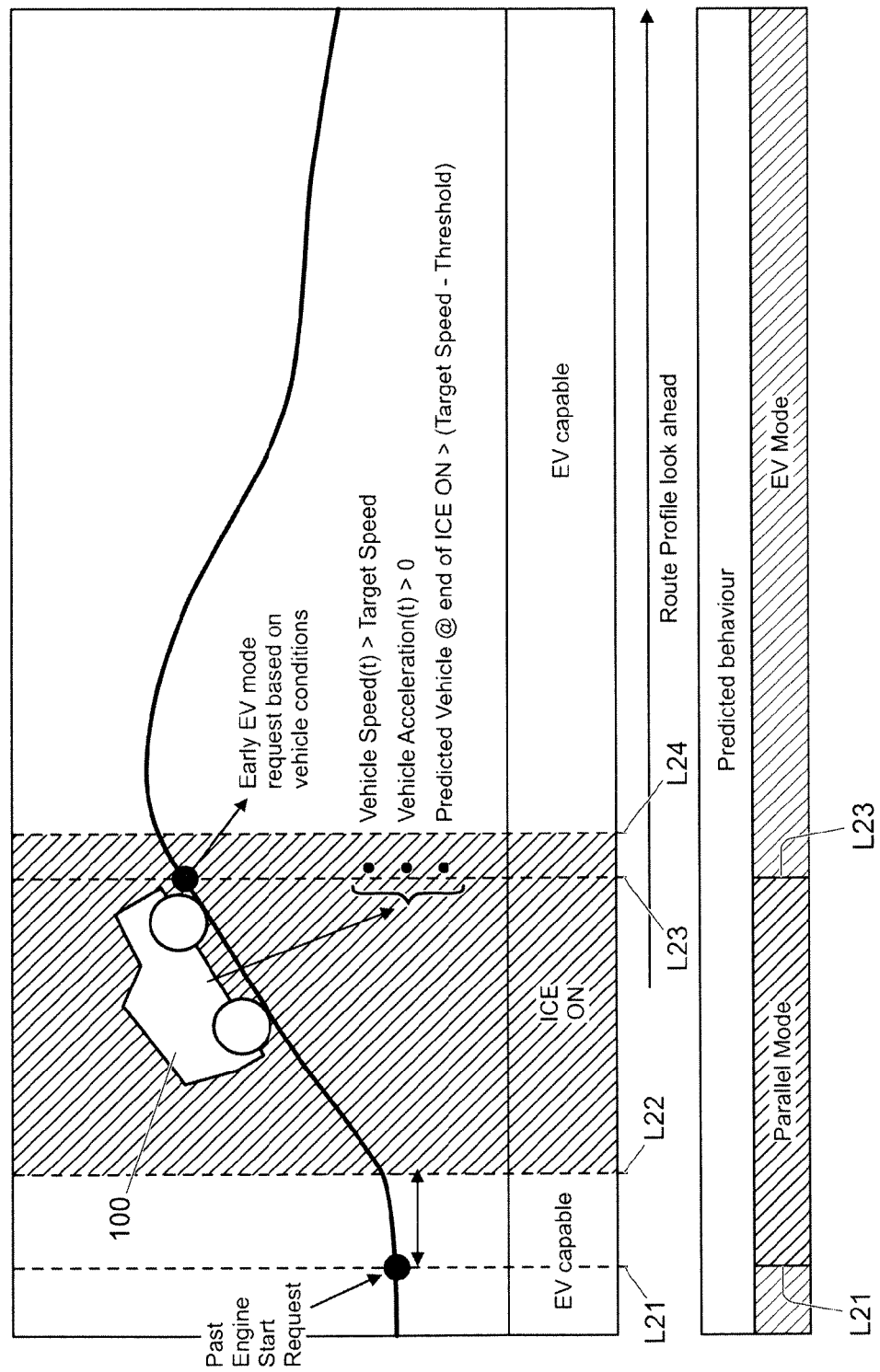
FIG. 4 is a schematic illustration of a method of operation of a hybrid electric vehicle according to an embodiment of the present invention.

FIG. 4 illustrates a similar scenario. Vehicle 100 is shown at a location at which it is ascending a hill in parallel boost mode. At location L21, the controller 140 determined that a distance to a boost location L22 was less than a value of distance_to_torque and therefore commanded assumption by the powertrain 135 of the parallel mode at location L21. At location L22, where torque was demanded that exceeded that which could be supplied by the CIMG 123 alone, the powertrain 135 assumed parallel boost mode. The controller 140 has also determined that the next EV mode location is at location L24, and that no boost location exists within a distance distance_future_torque of location L24.

As the vehicle 100 continues with the powertrain 135 in parallel boost mode, the controller 140 determines whether the vehicle is permitted to assume EV mode ahead of EV mode location L24. The controller 140 determines whether the vehicle speed exceeds the threshold value min_speed and whether the vehicle is decelerating. If the speed does exceed threshold value min_speed and the vehicle is not decelerating, the controller 140 determines whether a drop in speed of the vehicle 100 between its current location and the EV mode location L24 would exceed max_speed_drop. If the drop in speed would not exceed max_speed_drop, the controller 140 controls the powertrain 135 to assume EV mode at the vehicle's current location. In the scenario shown in FIG. 4, EV mode is assumed at location L23, ahead of EV mode location L24.

It is to be understood that in embodiments in which the controller 140 causes the vehicle to be operated in the parallel boost mode when the amount of required drive torque is more than that which can be provided in EV mode, and not the parallel idle or parallel recharge modes, the boost locations may be referred to as parallel boost locations. It is to be understood that the controller may determine that operation in the parallel boost mode is required at these locations because operation in a parallel idle or parallel recharge mode may not be permitted under circumstances where required torque demand exceeds that which may be provided in EV mode. It is to be understood that the vehicle may still be caused to operate in a parallel idle mode following closure of a clutch to connect the engine to a driveline of the vehicle, in preparation for assumption of the parallel boost mode, and the amount of drive torque provided by the engine 121 gradually increased as required in order to supplement the drive torque provided by the CIMG 123.

It is to be understood that in some embodiments an amount of fuel consumed by the vehicle 100 and an amount of gas emissions may be reduced by assuming EV mode in advance of location L24.

Furthermore, some embodiments of the present invention have the advantage that a drivability of a motor vehicle may be increased substantially. Furthermore, an amount of NVH associated with vehicle operation when negotiating hilly terrain may also be reduced. A durability of a vehicle may thereby be enhanced.

Embodiments of the present invention may be understood by reference to the following numbered paragraphs:

1. A control system for a hybrid electric vehicle, the vehicle having a powertrain comprising at least one electric propulsion motor and at least one engine, the control system being operable to control the vehicle to operate in an electric vehicle (EV) mode in which the at least one engine remains switched off and the at least one electric propulsion motor is configured to deliver drive torque and a boost mode in which the at least one engine is switched on to provide additional power to drive the vehicle, wherein when the vehicle is operating in EV mode the system is further operable to determine whether a boost location exists ahead of the vehicle being a location at which a gradient of a driving surface is sufficiently high to require selection of the boost mode, the control system being operable automatically to command starting of the at least one engine before the boost location is reached.

2. A system as described in paragraph 1 wherein in the boost mode the additional power to drive the vehicle is that power additional to the power providable by the at least one electric propulsion motor which is required to drive the vehicle at a desired vehicle speed, and wherein the boost location is a location at which a gradient of a driving surface is sufficiently high to require selection of the boost mode in order to maintain the desired vehicle speed.

3. A system as described in paragraph 1 wherein the system is operable to allow a driver to set a target vehicle speed and to control the powertrain to maintain the target vehicle speed, and wherein the boost location is a location at which a gradient of a driving surface is sufficiently high to require selection of the boost mode in order to maintain the target vehicle speed.

4. A system as described in paragraph 1 operable to command starting of the at least one engine sufficiently in advance of arrival at the boost location that the at least one engine may provide additional power substantially at that boost location.

5. A system as described in paragraph 1 operable to determine when to start the at least one engine in dependence on an amount of time required to start the at least one engine and an amount of time required to deliver power to drive the vehicle by means of the at least one engine following starting of the at least one engine.

6. A system as described in paragraph 1 operable to control the vehicle to operate in a parallel HEV mode in which the at least one engine delivers drive torque to drive the vehicle.

7. A system as described in paragraph 1 operable to control the vehicle to operate in a series HEV mode in which the at least one engine drives a generator to generate electricity to power the at least one electric propulsion motor.

8. A system as described in paragraph 3 wherein when the vehicle is operating in the boost mode the control system is operable to identify an EV mode location being a location ahead of the vehicle at which a gradient of the driving surface will be sufficiently low to allow resumption of operation in EV mode whilst allowing the target speed to be maintained.

9. A system as described in paragraph 8 further arranged to determine a location of the next boost location ahead of the next EV mode location.

10. A system as described in paragraph 9 operable to over-ride assumption of the EV mode at the next EV mode location if a time to travel from the next EV mode location to the following boost location is less than a prescribed time or a distance between the locations is less than a prescribed value.

11. A system as described in paragraph 1 configured wherein when the vehicle is operating in boost mode the control system is operable to assume EV mode in advance of arrival at an EV mode location if the control system determines that EV mode may be assumed without a drop in vehicle speed exceeding a prescribed value before the EV mode location is reached.

12. A system as described in paragraph 11 operable to determine whether EV mode may be assumed in advance of arrival at the EV mode location without a drop in vehicle speed exceeding a prescribed value in further dependence on at least one selected from amongst a current speed of the vehicle and a current rate of acceleration of the vehicle.

13. A system as described in paragraph 1 wherein the control system is operable in a first mode in which a target speed set by the driver is maintained with the at least one engine maintained switched off and a second mode in which a target speed set by the driver is maintained without preventing stopping and starting of the at least one engine, the control system being operable to start the at least one engine in advance of arrival at the boost location only if the control system is operated in the first mode.

14. A system as described in paragraph 1 comprising a location determining apparatus, the system being operable to receive data in respect of vehicle location and to determine driving surface gradient in dependence on the vehicle location data.

15. A system as described in paragraph 14 wherein the location determining apparatus comprises at least one selected from amongst a global positioning system (GPS) receiver and a cellular network location determination system.

16. A system as described in paragraph 14 operable to access a database containing data corresponding to a height or altitude of a driving surface as a function of location and to calculate a gradient of a driving surface ahead of the vehicle in dependence on said data and the data in respect of the location of the vehicle.

17. A system as described in paragraph 14 operable to access a database containing data in respect of driving surface gradient as a function of location and to determine a gradient of a driving surface ahead of the vehicle in dependence on the data in respect of the location of the vehicle.

18. A system as described in paragraph 3 operable automatically to command starting of the at least one engine before the boost location is reached regardless of whether or not a target vehicle speed has been set by the driver and the powertrain is controlled to maintain the target vehicle speed.

19. A hybrid electric vehicle comprising a system as described in paragraph 1.

20. A method of controlling a hybrid electric vehicle by means of a control system, the vehicle having a powertrain comprising at least one electric propulsion motor and at least one engine, the method comprising controlling the powertrain to operate in an electric vehicle (EV) mode in which the at least one engine remains switched off and the at least one electric propulsion motor is configured to deliver drive torque or a boost mode in which the at least one engine is switched on to provide additional power to drive the vehicle, wherein when in EV mode the method comprises determining by means of the control system whether a boost location exists ahead of the vehicle being a location at which a gradient of a driving surface is sufficiently high to require assumption of the boost mode, and
wherein if a boost location is identified ahead of the vehicle the method comprises commanding automatically by means of the control system starting of the at least one engine before the boost location is reached.

21. A method as described in paragraph 20 wherein in the boost mode the additional power to drive the vehicle is that power additional to the power provided by the at least one electric propulsion motor which is required to drive the vehicle at a desired vehicle speed, and wherein the boost location is a location at which a gradient of a driving surface is sufficiently high to require assumption of the boost mode in order to maintain the desired vehicle speed.

22. A method as described in paragraph 20 wherein the method comprises allowing a driver to set a target vehicle speed and controlling the powertrain by means of the control system to maintain the target vehicle speed, and wherein the boost location is a location at which a gradient of a driving surface is sufficiently high to require assumption of the boost mode in order to maintain the target vehicle speed.

23. A method as described in paragraph 20 comprising in the boost mode controlling the powertrain to operate in a parallel recharge mode in which the engine drives a generator to recharge a battery of the vehicle and in addition the engine provides drive torque to drive the vehicle, optionally the generator being provided by the electric propulsion motor operating in a generator mode.

24. A method as described in paragraph 20 comprising in the boost mode controlling the powertrain to operate in a parallel idle mode in which the engine provides drive torque to drive the vehicle and an electric propulsion motor does not provide drive torque.

25. A method as described in paragraph 20 comprising in the boost mode controlling the powertrain to operate in a parallel boost mode in which the engine and electric propulsion motor deliver drive torque to drive the vehicle.

26. A hybrid electric vehicle comprising:
a controller; and
a powertrain comprising at least one electric propulsion motor and at least one engine,
the powertrain being operable by the controller in an electric vehicle (EV) mode in which the at least one engine remains switched off and the at least one electric propulsion motor is configured to deliver drive torque and a boost mode in which the at least one engine is switched on to provide additional power to drive the vehicle,
wherein when in boost mode the controller is further operable to determine whether an EV mode location exists ahead of the vehicle being a location at which a gradient of a driving surface is sufficiently low to allow assumption of the EV mode whilst maintaining the target vehicle speed to within a prescribed amount, the controller being operable to allow assumption of the EV mode before the EV mode location is reached responsive to a determination that a drop in vehicle speed before reaching the EV mode location will not exceed a prescribed amount.

Throughout the description and claims of this specification, the words "comprise" and "contain" and variations of those words, for example "comprising" and "comprises", mean "including but not limited to", and are not intended to (and do not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A control system for a hybrid electric vehicle, the vehicle having a powertrain comprising at least one electric propulsion motor and at least one engine, the control system being configured to control the vehicle to operate in an electric vehicle (EV) mode in which the at least one engine remains switched off and the at least one electric propulsion motor is configured to deliver drive torque and in a boost mode in which the at least one engine is switched on to provide additional power to drive the vehicle,
the control system being configured to receive a target vehicle speed set by a driver and being configured to control the powertrain to maintain the target vehicle speed,
wherein the control system includes a determination module configured to, when the vehicle is operating in EV mode, determine whether a boost location exists ahead of the vehicle, wherein the boost location is a location at which a gradient of a driving surface requires selection of the boost mode in order to maintain the target vehicle speed, the control system being configured automatically to command starting of the at least one engine before the boost location is reached and wherein, when the vehicle is operating in the boost mode, the control system is configured to assume the EV mode in advance of arrival at an EV mode location if the control system determines that EV mode may be assumed without a drop in vehicle speed exceeding a prescribed value before the EV mode location is reached.

2. The control system of claim 1, wherein, in the boost mode, the additional power to drive the vehicle is power from the at least one engine that is required in addition to power provided by the at least one electric propulsion motor to drive the vehicle at a desired vehicle speed, and wherein the boost location is a location at which the gradient of the driving surface requires selection of the boost mode in order to maintain the desired vehicle speed.

3. The control system of claim 1, further configured to command starting of the at least one engine in advance of arrival at the boost location such that the at least one engine may provide the additional power at the boost location.

4. The control system of claim 1, wherein the determination module is configured to determine when to start the at least one engine in dependence on an amount of time required to start the at least one engine and an amount of time required to deliver power to drive the vehicle via the at least one engine following starting of the at least one engine.

5. The control system of claim 1, further configured to control the vehicle to operate in a parallel hybrid electric vehicle (HEV) mode in which the at least one engine delivers drive torque to drive the vehicle.

6. The control system of claim 1, further configured to control the vehicle to operate in a series HEV mode in which the at least one engine drives a generator to generate electricity to power the at least one electric propulsion motor.

7. The control system of claim 1, wherein, when the vehicle is operating in the boost mode, the control system is configured to identify an EV mode location ahead of the vehicle at which a gradient of the driving surface allows resumption of operation in EV mode whilst allowing the target speed to be maintained.

8. The control system of claim 7, wherein the determination module is further configured to determine a location of a next boost location ahead of a next EV mode location.

9. The control system of claim 8, wherein the determination module is configured to determine the time or distance between the next EV mode location and the next boost location, wherein the control system is further configured to over-ride assumption of the EV mode at the next EV mode location if a time to travel from the next EV mode location to the next boost location is less than a prescribed time or a distance between the EV mode location and the next boost location is less than a prescribed value.

10. The control system of claim 1, wherein the determination module is configured to determine at least one of a current speed of the vehicle and a current rate of acceleration of the vehicle and wherein the control system is further configured to determine whether the EV mode may be assumed in advance of arrival at the EV mode location without a drop in vehicle speed exceeding a prescribed value in further dependence on at least one selected from amongst a current speed of the vehicle and a current rate of acceleration of the vehicle.

11. The control system of claim 1, wherein the control system is operable in a first mode in which the system is configured to receive a target speed set by the driver and maintain the target speed with the at least one engine switched off and in a second mode in which the system is configured to receive a target speed set by the driver and maintain the target speed without preventing stopping and starting of the at least one engine, the control system being configured to start the at least one engine in advance of arrival at the boost location only if the control system is operated in the first mode.

12. The control system of claim 1, further comprising a location determining system, and wherein the control system is configured to receive vehicle location data from the location determining system and to determine driving surface gradient in dependence on the vehicle location data.

13. The control system of claim 12, wherein the location determining system comprises at least one of a global positioning system (GPS) receiver and a cellular network location determination system.

14. The control system of claim 12, further configured to access a database containing data corresponding to a height or altitude of the driving surface as a function of location and to calculate the gradient of the driving surface ahead of the vehicle in dependence on the height or altitude data and the vehicle location data.

15. The control system of claim 12, further configured to access a database containing data regarding driving surface gradient as a function of location, and to determine the gradient of the driving surface ahead of the vehicle in dependence on the vehicle location data.

16. The control system of claim 1, further configured automatically to command starting of the at least one engine before the boost location is reached regardless of whether or not the target vehicle speed has been set by the driver.

17. A method of controlling a hybrid electric vehicle, the vehicle having a powertrain comprising at least one electric propulsion motor and at least one engine, the method comprising the following performed by a control system of the vehicle:
controlling the powertrain to operate in an electric vehicle (EV) mode in which the at least one engine remains switched off and the at least one electric propulsion motor delivers drive torque or a boost mode in which the at least one engine is switched on to provide additional power to drive the vehicle;
receiving a target vehicle speed set by a driver;
controlling the powertrain to maintain the target vehicle speed;
determining, when the vehicle is in the EV mode, whether a boost location exists ahead of the vehicle, wherein the boost location is a location at which a gradient of a driving surface requires assumption of the boost mode in order to maintain the target vehicle speed; and
responsive to identifying the boost location, commanding automatically starting of the at least one engine before the boost location is reached; and
assuming the EV mode in advance of arrival at an EV mode location if the control system determines that EV mode may be assumed without a drop in vehicle speed exceeding a prescribed value before the EV mode location is reached.

18. The method of claim 17, wherein, in the boost mode, the additional power to drive the vehicle is power that is required in addition to power provided by the at least one electric propulsion motor to drive the vehicle at a desired vehicle speed, and wherein the boost location is a location at which the gradient of the driving surface requires assumption of the boost mode in order to maintain the desired vehicle speed.

19. The method of claim 17, further comprising, in the boost mode, controlling the powertrain to operate in a parallel recharge mode in which the engine drives a generator to recharge a battery of the vehicle and provides drive torque to drive the vehicle.

20. The method of claim 17, further comprising, in the boost mode, controlling the powertrain to operate in a parallel idle mode in which the engine provides drive torque to drive the vehicle and the at least one electric propulsion motor does not provide drive torque.

21. The method of claim 17, further comprising, in the boost mode, controlling the powertrain to operate in a parallel boost mode in which the engine and the at least one electric propulsion motor deliver drive torque to drive the vehicle.

22. A hybrid electric vehicle comprising:
a control system; and
a powertrain comprising at least one electric propulsion motor and at least one engine,
the powertrain being configured by the control system in an electric vehicle (EV) mode in which the at least one engine remains switched off and the at least one electric propulsion motor delivers drive torque, and a boost mode in which the at least one engine is switched on to provide additional power to drive the vehicle,
the control system being configured to allow a driver to set a target vehicle speed and being configured to control the powertrain to maintain the target vehicle speed,
wherein, when in the boost mode, the control system determines whether an EV mode location exists ahead of the vehicle at which a gradient of a driving surface allows assumption of the EV mode whilst maintaining the target vehicle speed to within a prescribed amount, the control system being configured to allow assumption of the EV mode before the EV mode location is reached responsive to a determination that a drop in vehicle speed before reaching the EV mode location will not exceed a prescribed amount.

* * * * *